United States Patent
Price et al.

(10) Patent No.: US 10,075,045 B2
(45) Date of Patent: Sep. 11, 2018

(54) ACTUATOR EXHAUST FLUID ENERGY HARVESTER

(71) Applicant: PHD, Inc., Fort Wayne, IN (US)

(72) Inventors: Nicole M. Price, Fort Wayne, IN (US); Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 15/470,959

(22) Filed: Mar. 28, 2017

(65) Prior Publication Data
US 2017/0288502 A1 Oct. 5, 2017

Related U.S. Application Data

(60) Provisional application No. 62/314,527, filed on Mar. 29, 2016.

(51) Int. Cl.
| | | |
|---|---|---|
| *H02K 7/18* | (2006.01) | |
| *H02J 7/00* | (2006.01) | |
| *F01N 5/04* | (2006.01) | |
| *F01B 1/01* | (2006.01) | |
| *F01B 31/28* | (2006.01) | |
| *F03B 1/00* | (2006.01) | |

(Continued)

(52) U.S. Cl.
CPC ............. *H02K 7/1823* (2013.01); *F01B 1/01* (2013.01); *F01B 31/28* (2013.01); *F01N 5/04* (2013.01); *F03B 1/00* (2013.01); *F03B 1/04* (2013.01); *F03B 13/00* (2013.01); *H02J 7/0068* (2013.01); *F05B 2220/602* (2013.01); *F05B 2240/2411* (2013.01)

(58) Field of Classification Search
CPC . H02K 7/1823; F03B 1/00; F03B 1/04; F03B 13/00
USPC ...................................... 290/43, 54
See application file for complete search history.

(56) References Cited

U.S. PATENT DOCUMENTS

| 4,086,764 A | 5/1978 | Brown et al. |
| 4,095,118 A | 6/1978 | Rathbun |

(Continued)

FOREIGN PATENT DOCUMENTS

DE  10 2006 029 403 A1  1/2008

OTHER PUBLICATIONS

"Energy Harvesting for Structural Health Monitoring Sensor Networks", Gyuhae Park, et al. retrieved from http://seelab.ucsd.edu/papers/gpark_asce07.pdf (30 pages).

(Continued)

*Primary Examiner* — Viet Nguyen
(74) *Attorney, Agent, or Firm* — Taylor IP, P.C.

(57) ABSTRACT

A fluid energy harvester, including a housing having at least one port and an outlet, and the housing defining at least one fluid passageway therein. The fluid energy harvester also includes a converter disposed within the housing and configured to convert at least a portion of potential energy in an exhaust fluid, a generator operably coupled to the converter and configured to generate an electrical current from the converter, a charging controller electrically coupled to the generator, and a storage medium electrically coupled to the generator and configured to store the electrical current generated by the generator. The fluid energy harvester further includes a nozzle configured to control a flow of the exhaust fluid.

16 Claims, 14 Drawing Sheets

(51) Int. Cl.
*F03B 1/04* (2006.01)
*F03B 13/00* (2006.01)

(56) References Cited

U.S. PATENT DOCUMENTS

| | | | |
|---|---|---|---|
| 5,559,379 A * | 9/1996 | Voss | F01D 17/14 |
| | | | 290/1 R |
| 5,775,107 A | 7/1998 | Sparkman | |
| 6,956,300 B2 | 10/2005 | Gizara | |
| 7,088,012 B2 | 8/2006 | Gizara | |
| 7,605,486 B2 | 10/2009 | Bridwell | |
| 7,671,479 B2 | 3/2010 | Kim et al. | |
| 7,750,491 B2 | 7/2010 | Sankrithi | |
| 7,977,924 B2 | 7/2011 | Hedtke et al. | |
| 8,040,022 B2 | 10/2011 | Sapir | |
| 8,188,608 B2 * | 5/2012 | Tell | F04F 5/44 |
| | | | 290/1 A |
| 8,209,974 B2 * | 7/2012 | McBride | F15B 1/024 |
| | | | 60/410 |
| 8,415,819 B2 | 4/2013 | Sapir et al. | |
| 8,424,287 B2 | 4/2013 | Atlluri et al. | |
| 8,461,705 B2 * | 6/2013 | Kuroishi | F03B 3/00 |
| | | | 290/43 |
| 8,467,907 B2 | 6/2013 | Hagler | |
| 8,749,098 B2 | 6/2014 | Chan et al. | |
| 8,841,786 B2 * | 9/2014 | Tucker | F01C 1/103 |
| | | | 290/1 R |
| 9,090,253 B2 | 7/2015 | Flath et al. | |
| 2004/0195840 A1 * | 10/2004 | Baarman | C02F 1/325 |
| | | | 290/43 |
| 2008/0155975 A1 * | 7/2008 | Brinkman | F15B 11/036 |
| | | | 60/414 |
| 2008/0217921 A1 | 9/2008 | Raftery | |
| 2008/0217923 A1 * | 9/2008 | Yen | F03B 13/00 |
| | | | 290/54 |
| 2008/0231056 A1 * | 9/2008 | Wen | F03B 13/00 |
| | | | 290/54 |
| 2011/0064626 A1 | 3/2011 | Kennedy | |
| 2011/0071698 A1 * | 3/2011 | Glasser | F03B 13/00 |
| | | | 700/296 |
| 2011/0101695 A1 * | 5/2011 | Sedlacek | F03B 3/04 |
| | | | 290/52 |
| 2013/0277980 A1 * | 10/2013 | Kiyose | F03B 3/12 |
| | | | 290/54 |
| 2015/0108758 A1 | 4/2015 | Oakes et al. | |
| 2015/0275844 A1 * | 10/2015 | Winkler | F03B 1/04 |
| | | | 415/80 |
| 2015/0345471 A1 * | 12/2015 | Smith | F03D 9/17 |
| | | | 290/54 |
| 2016/0230784 A1 | 8/2016 | Shani et al. | |
| 2016/0258321 A1 * | 9/2016 | Thompson | F02M 35/10229 |
| 2016/0319691 A1 * | 11/2016 | Aumann | F01K 25/10 |

OTHER PUBLICATIONS

Extended European Search Report dated Sep. 9, 2017 for European Patent Application No. 17163253 (8 pages).

* cited by examiner

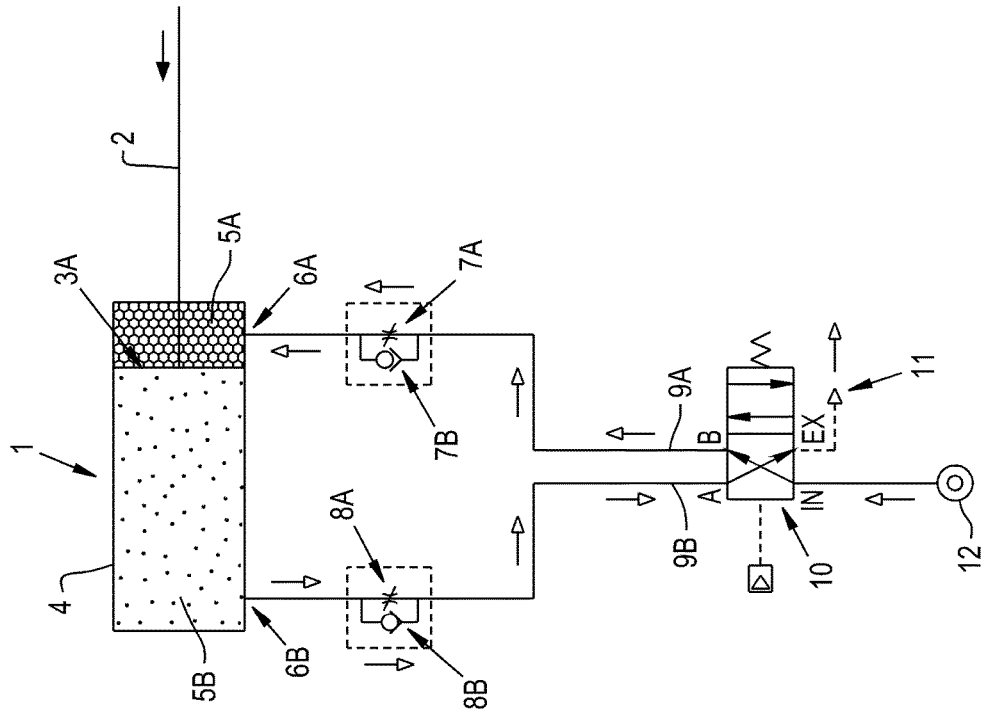
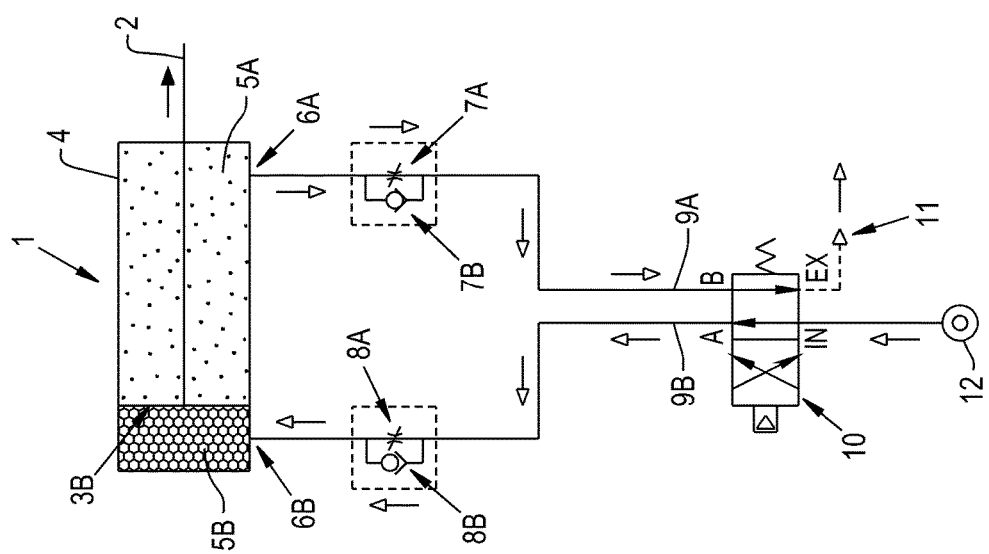
Fig. 2B (Prior Art)
Fig. 2A (Prior Art)

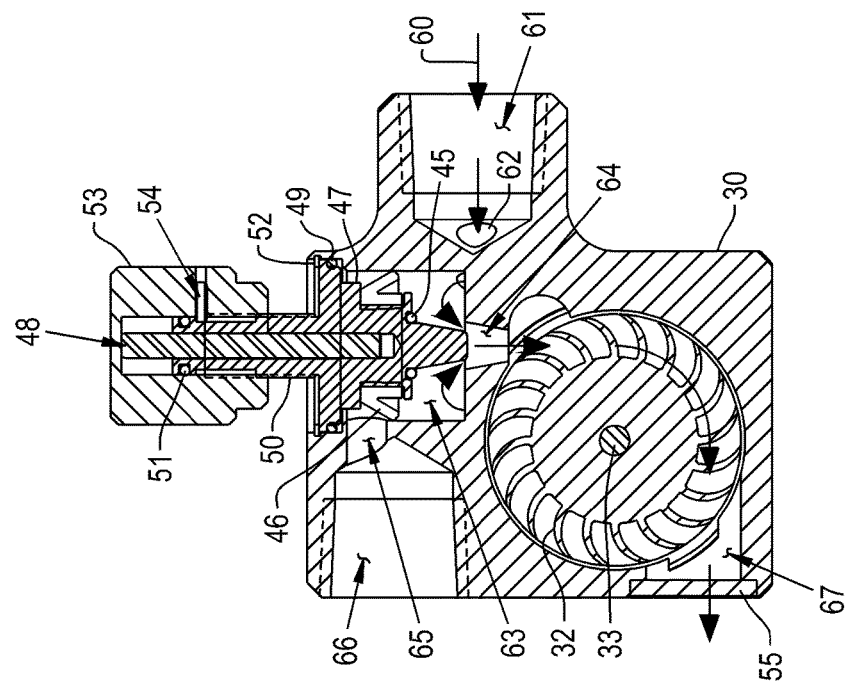
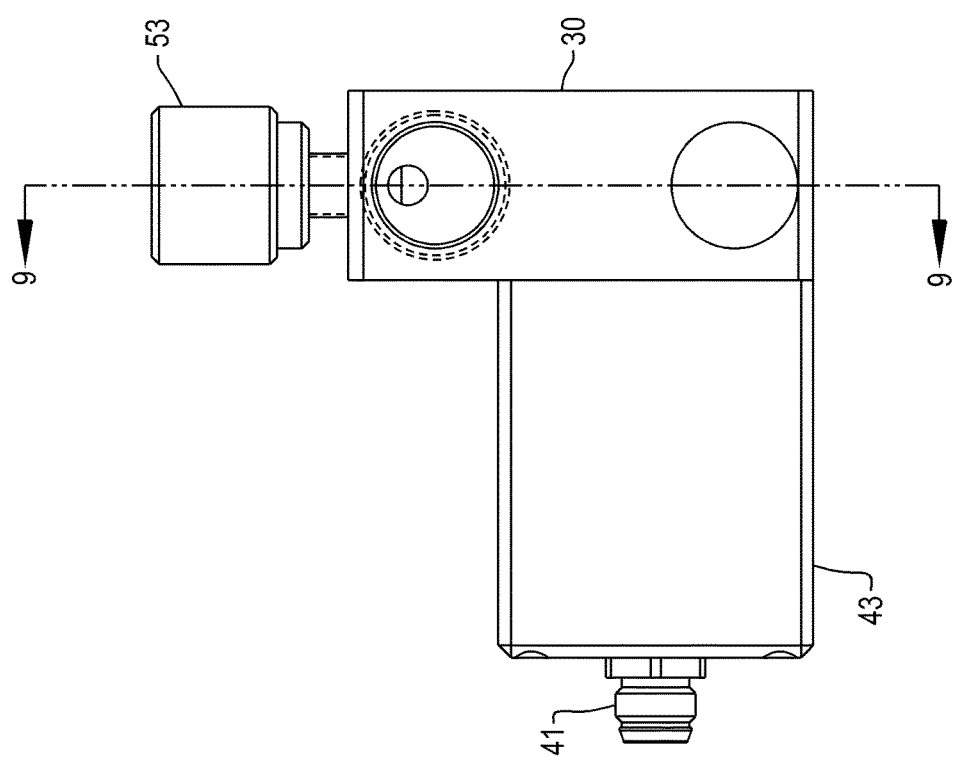
Fig. 9
Fig. 8

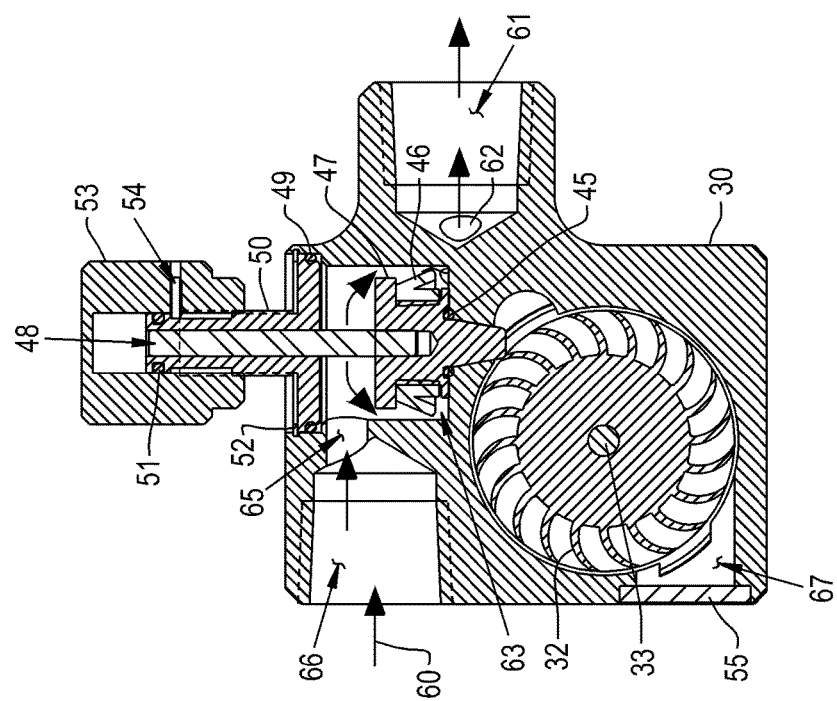
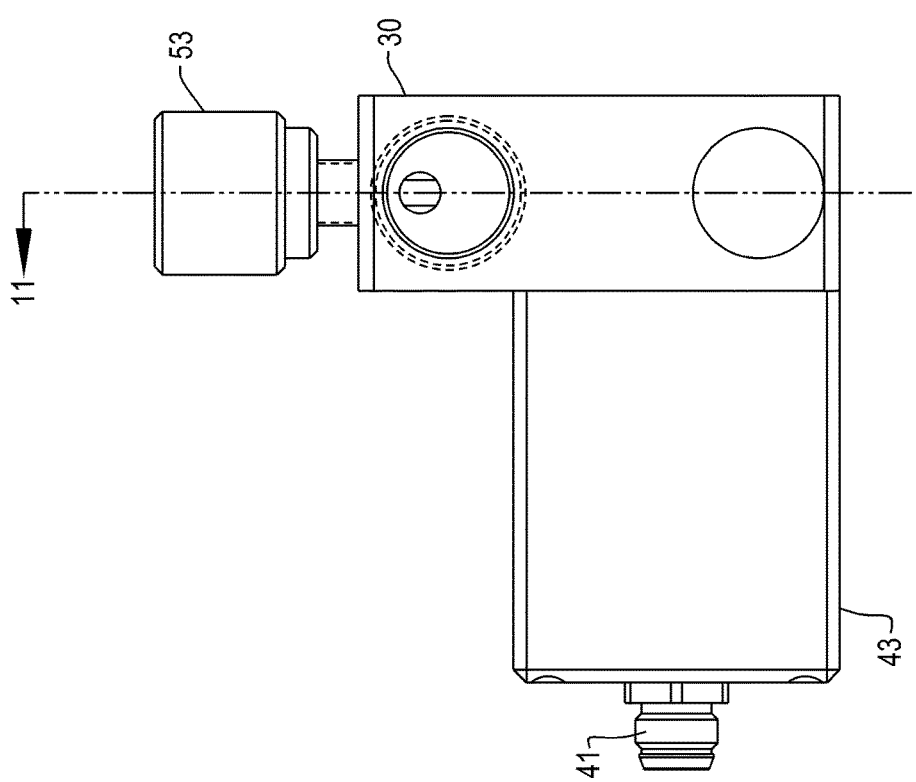

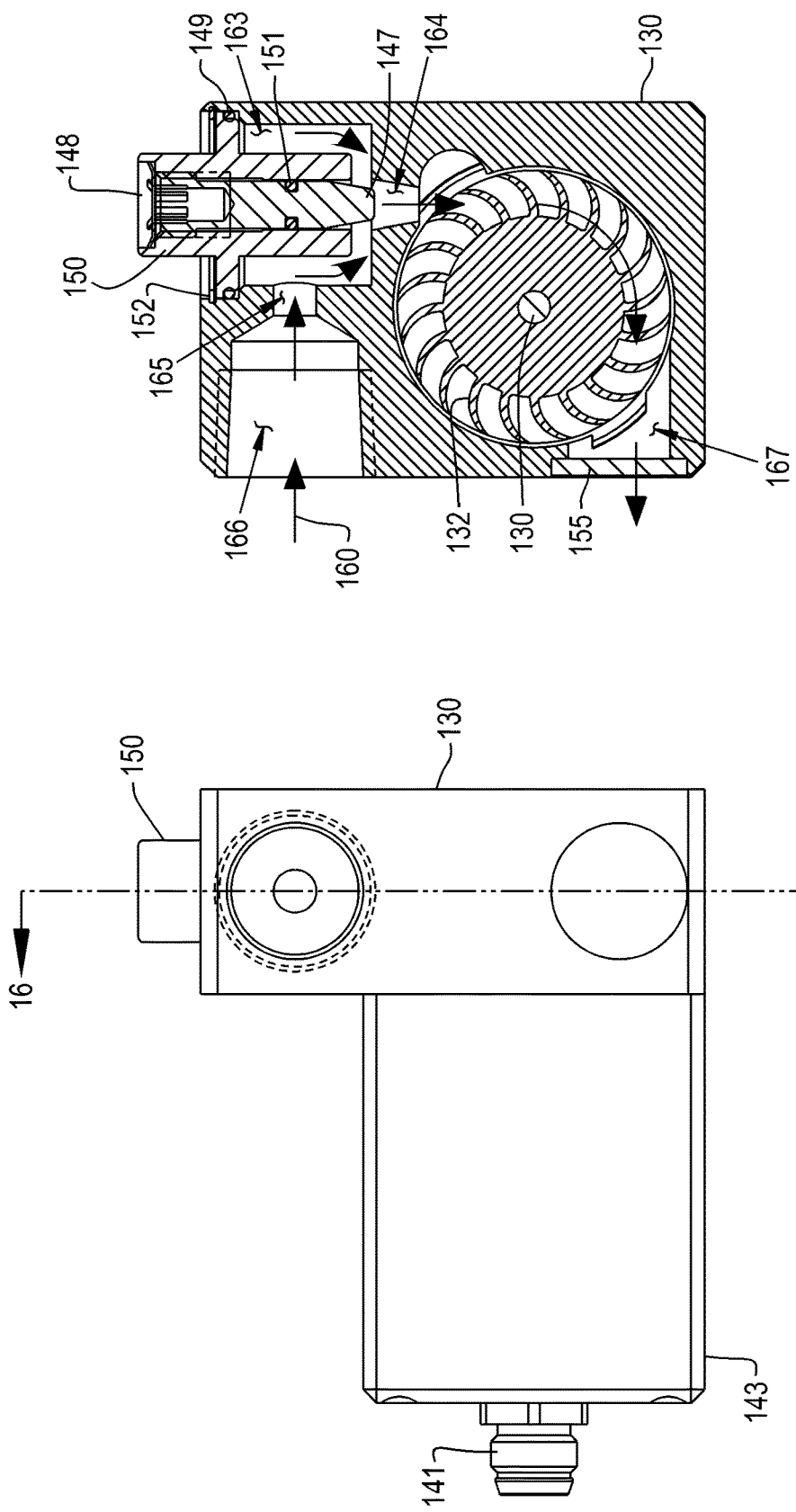

ACTUATOR EXHAUST FLUID ENERGY HARVESTER

CROSS REFERENCE TO RELATED APPLICATIONS

This is a non-provisional application based upon U.S. provisional patent application Ser. No. 62/314,527, entitled "ACTUATOR EXHAUST FLUID ENERGY HARVESTER", filed Mar. 29, 2016, which is incorporated herein by reference.

BACKGROUND OF THE INVENTION

1. Field of the Invention

The present invention relates to energy harvesters, and, more particularly, to an exhaust fluid energy harvester in a motive system that generates electrical energy in order to store the electrical energy and/or use it to power an external load.

2. Description of the Related Art

Actuators are mechanical or electromechanical devices which convert energy into mechanical motion. Often, mechanical actuators are powered with a compressed fluid which alternately enters and exits a cylindrical volume to act against a movable piston and rod assembly. The rod is extended by fluid pressure acting on one face of the piston and is retracted when fluid acts on the opposing face of the piston. To affect motion, the face of the piston upon which motive fluid pressure acts must be continuously supplied with pressurized fluid from a supply, while any pressurized fluid acting on the opposing face of the piston is continuously exhausted so as to maintain a continuous pressure differential between the two faces. The motive force produced on the piston is proportional to the magnitude of this pressure differential.

It is often advantageous to produce as large a motive force as possible by exhausting the fluid present on the exhaust side of the piston to as low a pressure as possible; typically, to the ambient pressure of the environment in which the actuator is operated. As the actuator cycles, moving the piston and rod attached to the piston in a reciprocating motion, the supply side of the piston on a given stroke of the piston and rod becomes the exhaust side of the piston on the successive stroke. The fluid on the supply side of piston is ideally maintained at the full pressure of the fluid supply in order to produce the maximum work output from the actuator. At the completion of a stroke, the volume of fluid on the supply side of the piston remains at full supply pressure until the fluid is subsequently exhausted during the reciprocal successive stroke. This volume of fully pressurized fluid contains a quantity of potential energy proportional to the volume and pressure of the fluid. As the fluid is exhausted to the low pressure environment or other low pressure sump, the potential energy stored in the compressed fluid is lost from the motive system. This loss of energy degrades the efficiency of the system.

What is needed in the art is a cost-effective device to recoup as much of the lost energy as is practical, so as to increase the overall efficiency of the motive system.

SUMMARY OF THE INVENTION

The present invention provides a fluid energy harvester for harvesting electrical energy from the compressed fluid present on the exhaust side of an actuator piston. The electrical energy can be used to perform other useful work elsewhere in the actuator system.

The present invention in one form is directed to a fluid energy harvester, including a housing having at least one port and an outlet, and the housing defining at least one fluid passageway therein. The fluid energy harvester also includes a converter disposed within the housing and configured to convert at least a portion of potential energy in an exhaust fluid, a generator operably coupled to the converter and configured to generate an electrical current from the converter, a charging controller electrically coupled to the generator, and a storage medium electrically coupled to the generator and configured to store the electrical current generated by the generator. The fluid energy harvester further includes a nozzle configured to control a flow of the exhaust fluid.

The present invention in another form is directed to an actuating system. The actuating system includes a fluid supply for supplying a fluid and an actuator. The actuator includes a piston having a piston rod, a first piston face, and a second piston face. The actuator further includes a piston housing substantially encasing the piston and defining a first volume and a second volume respectively adjacent to the first piston face and the second piston face, and a first port and a second port fluidly connected respectively with the first volume and the second volume of the piston housing. The actuating system also includes a valve fluidly connected to the fluid supply and the actuator, and having an exhaust port, and a fluid energy harvester fluidly connected to the actuator. The fluid energy harvester includes a housing having a first port, a second port, and an outlet, and the housing defining at least one fluid passageway therein. The fluid energy harvester also includes a converter disposed within the housing and configured to convert at least a portion of potential energy in the fluid exhausting from the actuator, a generator operably coupled to the converter and configured to generate an electrical current from the converter, a charging controller electrically coupled to the generator, and a storage medium electrically coupled to the generator and configured to store the electrical current generated by the generator. The fluid energy harvester further includes a moveable needle disposed within the at least one passageway of the housing and configured to control a flow of the fluid.

The present invention in yet another form is directed to an actuating system. The actuating system includes a fluid supply for supplying a fluid and an actuator. The actuator includes a piston having a piston rod, a first piston face, and a second piston face. The actuator also includes a piston housing substantially encasing the piston and defining a first volume and a second volume respectively adjacent to the first piston face and the second piston face, and a first port and a second port fluidly connected respectively with the first volume and the second volume of the piston housing. The actuating system also includes a valve fluidly connected to the fluid supply and the actuator, and having an exhaust port, and a fluid energy harvester fluidly connected to the actuator. The fluid energy harvester includes a housing having a port and an outlet, and the housing defining at least one fluid passageway therein. The fluid energy harvester also includes a converter disposed within the housing and configured to convert at least a portion of potential energy in the fluid exhausting from the actuator, a generator operably coupled to the converter and configured to generate an electrical current from the converter, a charging controller electrically coupled to the generator, and a storage medium electrically coupled to the generator and configured to store the electrical current generated by the generator. The fluid energy harvester further includes a moveable needle associated with the at least one passageway of the housing and configured to control a flow of the fluid.

An advantage of the present invention is that greater efficiencies of a motive system can be achieved.

Another advantage of the present invention is that harvested energy which would have been lost in a traditional motive system can be stored or used to perform work elsewhere in the motive system.

Yet another advantage of the present invention is that motion of the actuator can be controlled while simultaneously harvesting energy from the exhaust fluid.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIGS. 2A-2B are schematic representations of the typical actuator as shown in FIG. 1, illustrating the movement of the piston and rod relative to the housing;

FIG. 8 is a side view of the energy harvester as shown in FIG. 5;

FIG. 9 is a cross sectional view of the energy harvester as shown in FIG. 8 taken across line 9-9;

FIG. 10 is a side view of the energy harvester as shown in FIG. 5;

FIG. 11 is a cross sectional view of the energy harvester as shown in FIG. 10 taken across line 11-11;

FIG. 15 is a side view of the energy harvester as shown in FIG. 12;

FIG. 16 is a cross sectional view of the energy harvester as shown in FIG. 15 taken across line 16-16;

Corresponding reference characters indicate corresponding parts throughout the several views. The exemplifications set out herein illustrate embodiments of the invention and such exemplifications are not to be construed as limiting the scope of the invention in any manner.

DESCRIPTION OF THE INVENTION

Figure 1:
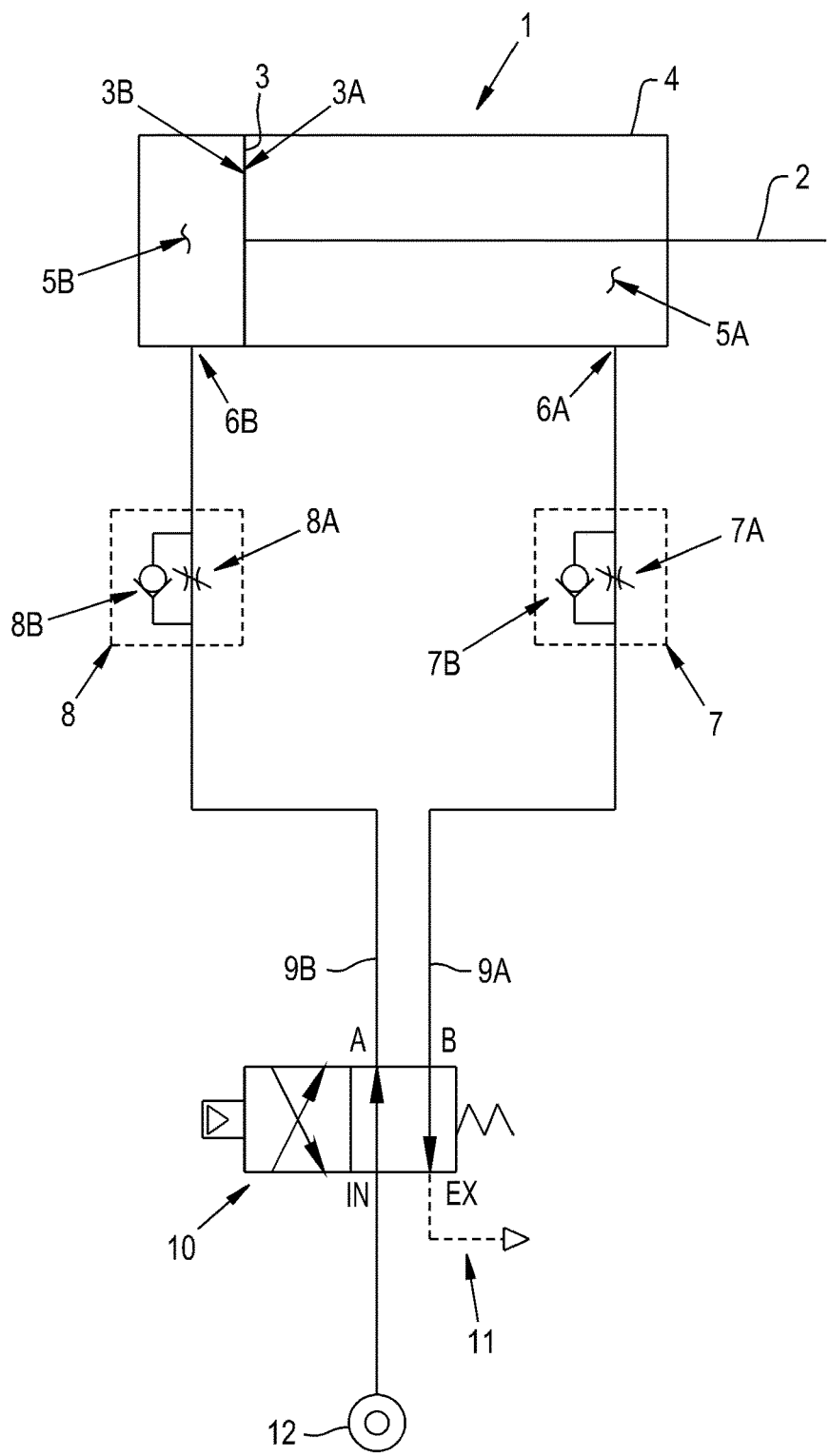
FIG. 1 is a schematic representation of a typical actuator known in the art.

Referring now to FIG. 1, there is shown a schematic representation of a typical actuator 1 known in the art, in which the actuator rod 2 is extended and retracted by a pressurized fluid acting against the faces 3A and 3B of the piston 3. Housing 4 guides rod 2 and encloses piston 3 to form volumes 5A and 5B adjacent to piston faces 3A and 3B, respectively. Flow controls 7 and 8 connect fluid lines 9A and 9B to double acting valve 10. Valve 10 is able to connect lines 9A and 9B to either pressurized fluid supply 12 or exhaust 11, depending on the position of the valve 10. Flow controls 7 and 8 can be in the form of throttling devices 7A and 8A and check valves 7B and 8B, respectively. Throttling devices 7A and 8A can be adjusted to meter the flow rate of pressurized fluid passing through them. Check valves 7B and 8B are configured to allow fluid to flow freely through them when the fluid is moving to enter the actuator 1 (i.e. when moving from line 9 toward port 6), while completely blocking flow when the fluid exits the actuator 1 (i.e. when moving from port 6 toward line 9). In this fashion, fluid flow entering the actuator 1 can pass freely through the open check valve, bypassing the restriction to flow created by the throttling device, while flow exiting the actuator 1 is forced by the closed check valve to the flow restriction created by the throttling device. In the field of art, this arrangement is known as "meter out" speed control, with the adjustable flow rate imposed on the fluid exhausting from the actuator 1 by the appropriate throttling device controlling the speed of the piston 3 and the actuator rod 2.

Referring now to FIG. 2A, there is shown a schematic operation of a typical actuator system known in the art, in which the actuator rod 2 is extending away from housing 4. Pressurized fluid, flowing from supply 12, is routed by valve 10 to line 9B. Passing through open check valve 8B, the fluid bypasses throttling device 8A to enter port 6B and fill volume 5B. The fluid pressure acting against piston face 3B acts to move the piston 3 and extend the attached actuator rod 2 away from housing 4. Simultaneously, the pressurized fluid occupying volume 5A exhausts through port 6A toward flow control 7. Closed check valve 7B forces the exhaust flow to pass through throttling device 7A, to govern the speed of the extending rod 2. The exhaust flow from line 9A passes through valve 10 to be exhausted to ambient pressure through exhaust port 11.

Referring now to FIG. 2B, there is shown a schematic operation of the same actuator system shown in FIG. 2A, but when the actuator rod 2 is retracting toward housing 4. Pressurized fluid, flowing from supply 12, is directed by valve 10 to line 9A. Passing through open check valve 7B, the fluid bypasses throttling device 7A to enter port 6A and fill volume 5A. The fluid pressure acting against piston face 3A acts to move the piston 3 and retract the attached actuator rod 2 toward housing 4. Simultaneously, the pressurized fluid occupying volume 5B exhausts through port 6B toward flow control 8. Closed check valve 8B forces the exhaust flow to pass through throttling device 8A, to govern the speed of the retracting rod 2. The exhaust flow from line 9B passes through valve 10 to be exhausted to ambient pressure through exhaust port 11.

Figure 3B:
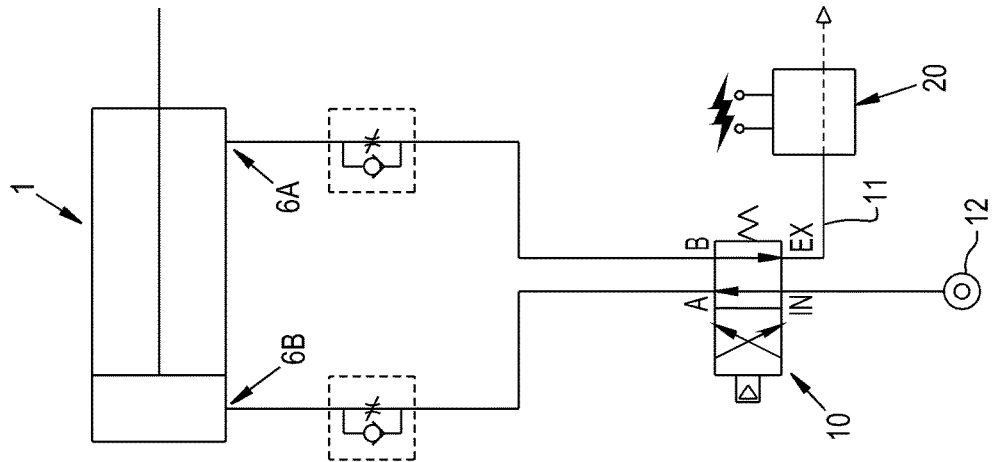
FIGS. 3A-3B are schematic representations of an actuator system incorporating an energy harvester according to the present invention.
Figure 3A:
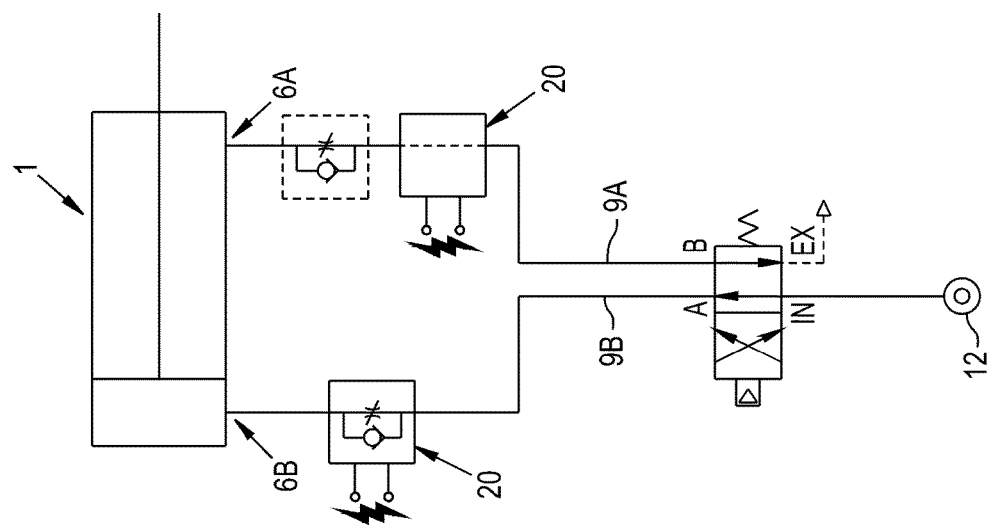

FIGS. 3A and 3B schematically show some of the possible locations at which an energy harvester 20 can be integrated into an actuator system. Although the invention is disclosed in conjunction with a pneumatic actuator producing a reciprocating linear motion, it is understood that the invention can also be applied to hydraulically powered actuators and actuators producing rotary or curvilinear motion.

FIG. 3A shows harvester 20 located adjacent to the ports 6A, 6B of actuator 1. The harvester 20 can be configured to also incorporate the functions of flow control (check valve and throttling device) as shown in the harvester 20 located between port 6B and line 9B. The harvester 20 can also be added adjacent to a discrete flow control as shown in the harvester 20 located between port 6A and line 9A. Locating the harvester adjacent to ports 6A, 6B offers the possible benefit of increasing the amount of energy available from the exhaust flow for harvest, since energy is lost from the exhaust flow in the form of frictional heat generated between the flow and walls of the conduit conveying the flow, as the flow moves progressively away from the ports 6A, 6B. However, a harvester 20 located adjacent to ports 6A, 6B can only harvest energy from the actuator port to which it is attached, creating the disadvantage of requiring two harvesters 20 to be used in order to extract energy from the entire quantity of fluid exhausted from the actuator 1.

FIG. 3B shows harvester 20 attached to the exhaust port 11 of valve 10. Locating the harvester 20 in this position, offers the advantage of allowing a single harvester 20 to extract energy from the entire quantity of fluid exhausted from the actuator 1, since both of the exhaust flows from both ports 6A, 6B of actuator 1 are alternately directed to common exhaust port 11 by valve 10. Locating the harvester 20 at exhaust port 11 has the possible disadvantage of reducing the amount of energy available from the exhaust flow for harvest, since energy is lost from the exhaust flow in the form of frictional heat generated between the flow and walls of the conduit conveying the flow, as the flow moves progressively away from actuator ports 6A, 6B.

Figure 4:
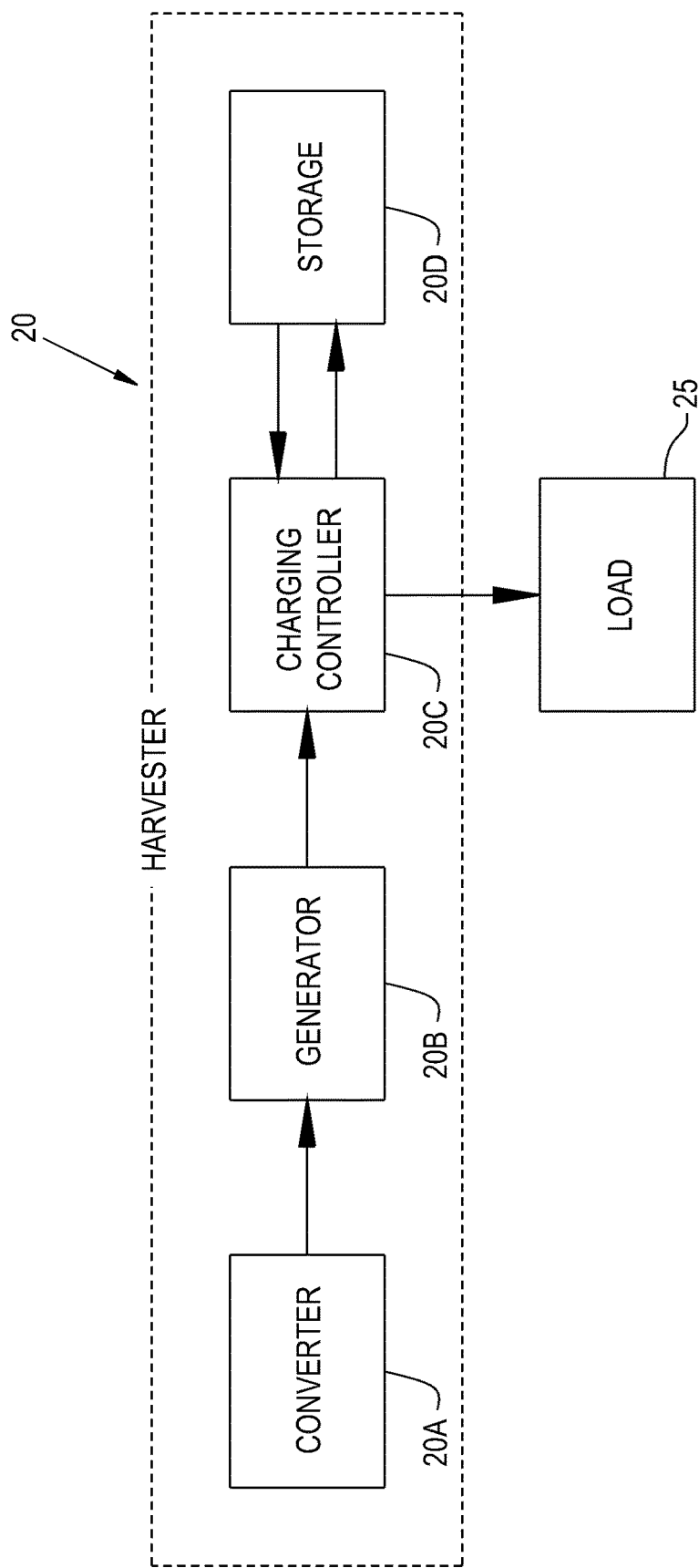
FIG. 4 is a schematic diagram illustrating an energy harvester according to the present invention.

FIG. 4 shows a schematic representation of the components of the energy harvesting system 20 according to the present invention. The energy harvesting system 20 provides energy to external load 25. Energy is extracted from the exhaust fluid stream by converter 20A, which converts a portion of the potential energy stored in the compressed exhaust fluid into mechanical motion. Generator 20B generates an electrical current from the mechanical motion produced by converter 20A. Charging controller 20C directs the electrical current produced by generator 20B into storage medium 20D during periods when the power produced by generator 20B exceeds the power demanded by external load 25. Charging controller 20C provides an electrical current from storage medium 20D to external load 25 during periods when the power demanded by the external load 25 exceeds the power produced by generator 20B.

Converter 20A can include any suitable means common in the art of converting fluid flow into mechanical motion. For example, impingement of the flow, either axially or tangentially, onto a bladed turbine can convert the fluid motion into rotation of the turbine. The action of a linear oscillating spring-mass positive volume displacement pump can be reversed so that the fluid flow produces a reciprocating linear motion. In a similar manner, an alternating-valve-oscillating-piston-positive-volume-displacement pump can be used to produce a reciprocating linear motion. The action of a Wankle rotary pump can be reversed to produce rotary motion. The Bernoulii Effect can be exploited to produce either a fluttering flexion or oscillating torsional twisting of a reed over which the fluid flow is directed.

Any means known in the art can be used to perform the function of Generator 20B. For example, the action of an electric motor can be reversed to convert mechanical rotation into electrical current. Reciprocating linear motion can be converted into electrical current by the action of a magnet moving relative to a helical coil formed by an electrical conductor encircling the magnet. Flexion of a reed can be converted into an electrical current through a piezoelectric film laminated onto the reed. Laminated piezoelectric film or the reversed action of an electric motor are suitable to convert the torsional twisting of a reed into an electrical current.

Charging controller 20C can include an electrical integrated circuit (IC) specifically designed for the task, such as the bq25504 IC which is manufactured for energy harvesting applications by Texas Instruments Corporation.

Storage medium 20D can include any suitable combination of rechargeable batteries, super-capacitors, and/or conventional capacitors.

Figure 5:
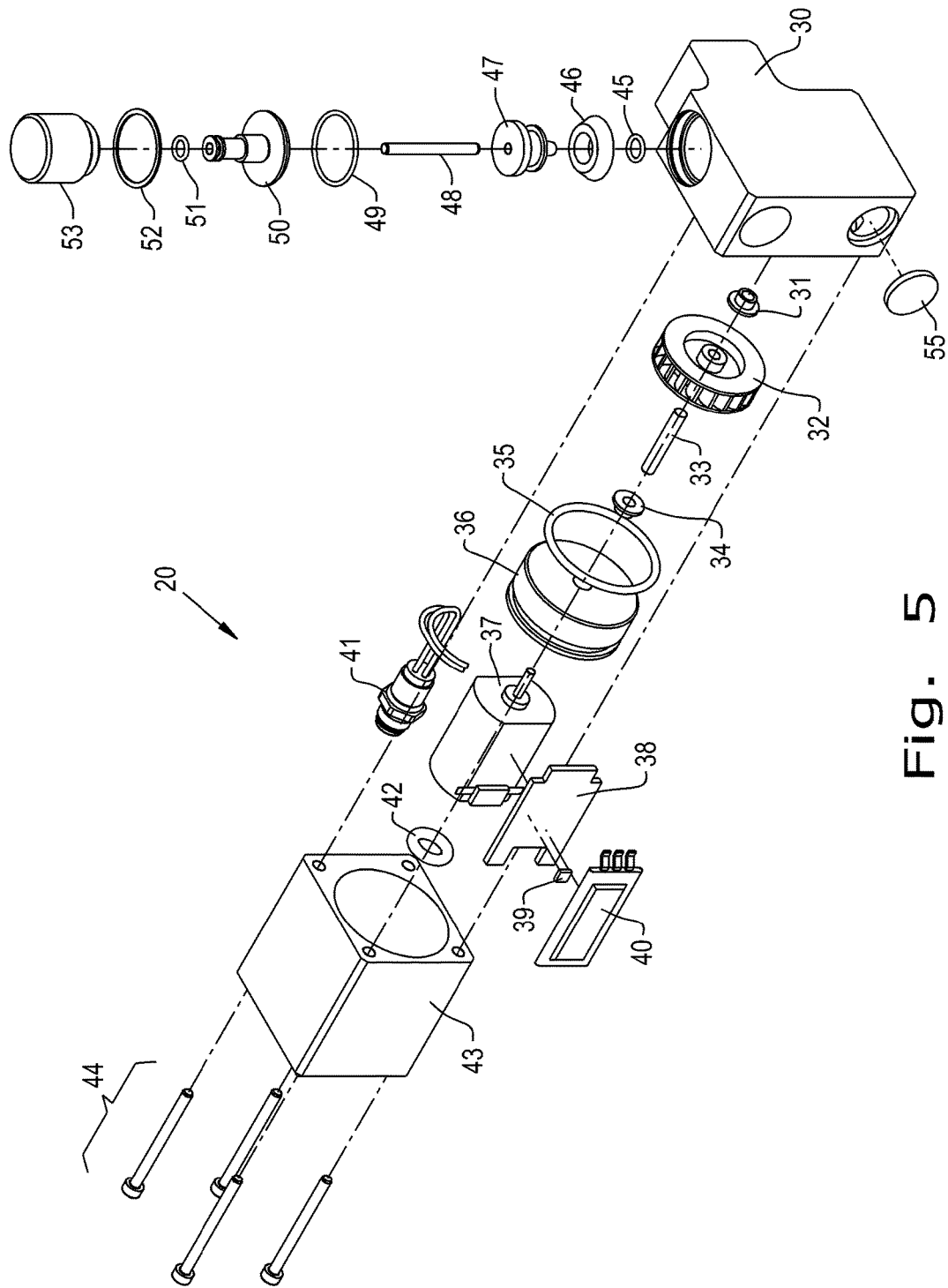
FIG. 5 is an exploded view of an embodiment of an energy harvester according to the present invention.
Figure 6:
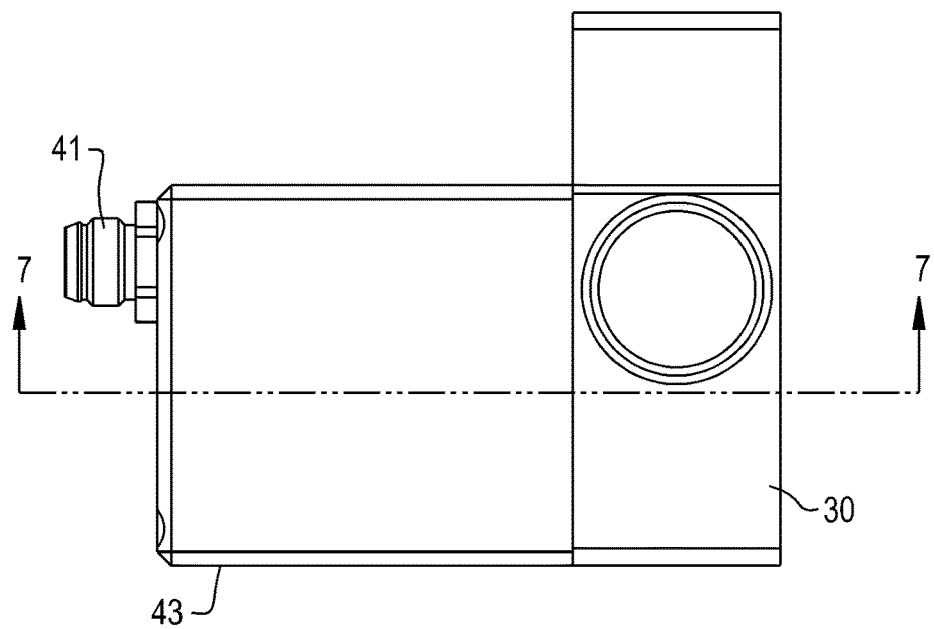
FIG. 6 is a top view of the energy harvester as shown in FIG. 5.
Figure 7:
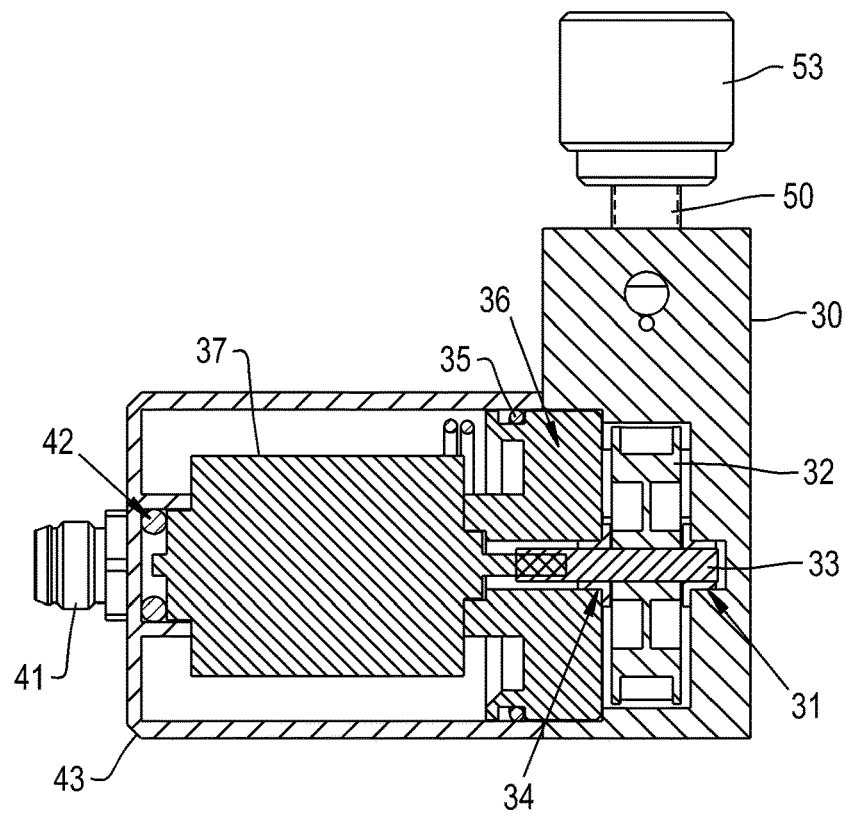
FIG. 7 is a cross sectional view of the energy harvester as shown in FIG. 6 taken across line 7-7.

FIG. 5 shows an exploded isometric view, and FIGS. 7 and 9 show section views, of a first embodiment of energy harvester 20, intended to be located between port 6B and line 9B as shown in FIG. 3A. Bearing bushing 31 is disposed into a mating bore in housing 30. Shaft 33 is bonded to turbine 32 so that rotation of turbine 32 causes a like rotation of shaft 33, with one end of shaft 33 supported by bearing bushing 31. The opposing end of shaft 33 is supported by bearing bushing 34. Bushing 34 is disposed into a mating bore in plug 36. The actions of bearing bushings 31 and 34 allow shaft 33 and turbine 32 to rotate freely, while preventing axial translation of the shaft 33 and turbine 32 between plug 36 and housing 30. O-ring seal 35 seals the periphery of plug 36 to prevent the ingress of moisture past the plug 36. The input shaft of electrical generator 37 is bonded to one end of shaft 33 so that rotation of the shaft 33 by turbine 32 causes a like rotation of the generator input shaft. The electrical output terminals of generator 37 are electrically connected to printed circuit board (PCB) 38. Also, electrically connected to PCB 38 are charging controller IC 39 and storage super-capacitor 40. Turbine 32, generator 37, charging controller IC 39, and storage super-capacitor 40 perform the actions respectively of converter 20A, generator 20B, charging controller 20C, and storage medium 20D, which are shown schematically in FIG. 4. Electrical connector 41 connects electrically to PCB 38 and provides a way of connecting harvester 20 to an external load, represented schematically as load 25 in FIG. 4. Elastomeric O-ring 42 is disposed within a bore in cover 43 so as to remove any physical space that might occur between generator 37 and cover 43 resulting from the dimensional variation of the components that comprise the harvester 20. Threaded fasteners 44 physically attach cover 43 to housing 30. An O-ring seal 45 is disposed within a complimentary recess in a needle 47 (FIG. 9). Check seal 46 is disposed within a complimentary gland in needle 47. One end of pin 48 is disposed within a mating bore in needle 47. The opposing end of pin 48 passes through a bore in cap 50. Pin 48 is constrained from radial movement by the bore in cap 50, but the pin 48 is free to translate along the longitudinal axis of the cap 50. The flange portion of cap 50 is disposed into a complimentary bore in housing 30. Retaining ring 52 retains cap 50 within a mating bore in housing 30, while O-ring seal 49 prevents the passage of pressurized fluid around the flange portion of cap 50. Speed adjustment knob 53 threads onto cap 50. Pin 54 is secured into a mating bore in knob 53 after the knob 53 is threaded on the cap 50 to prevent the knob 53 from subsequently being able to be completely unthreaded from cap 50. O-ring seal 51, seated within a complimentary gland in cap 50, seals against knob 53 to prevent the egress of fluid around pin 48.

Arrows 60 in FIGS. 9 and 11 show the direction of flow of pressurized fluid through harvester 20. The housing 30 has at least one fluid passageway, for example, it may include four fluid passageways in the form of a passage 62, a cavity 63, a nozzle 64, and a passage 65. Passages 62 and 65 fluidly connect ports 61 and 66, respectively, with the cavity 63. The moveable needle 47 is associated with at least one fluid passageway of the housing 30. In the present embodiment, the needle 47 is disposed within the cavity 63 and can be selectively adjusted with respect to and engaged with the nozzle 64 to adjust and/or close off fluid flow therethrough. In this manner, the needle 47 is configured to adjust a flow of the fluid as it can adjust fluid flow within cavity 63 and through nozzle 64.

FIG. 9 shows the operation of harvester 20 when exhaust fluid is flowing from port 6B to line 9B (see also FIG. 3A). Pressurized fluid enters port 61 in housing 30 and flows through passage 62 into cavity 63 and through the annular orifice formed between needle 47 and conical nozzle 64 in body 30. Nozzle 64 directs the fluid flow to impinge upon the vanes of turbine 32 causing the turbine 32 to spin along with shaft 33. The exhaust flow, depleted of kinetic energy by the action of impingement against the vanes of turbine 32, subsequently exits housing 30 through outlet 67 and porous plug 55, which is retained in a complimentary bore in housing 30. Fluid pressure acting on the underside of check seal 46 causes the skirt of the check seal 46 to inflate radially outwards to seal against the walls of cavity 63, preventing the flow of fluid through passage 65 and out of port 66 in housing 30. The axial position of needle 47 relative to nozzle 64 determines the area of the annulus through which the fluid flows prior to exiting through the nozzle 64, creating the ability to meter the flow rate of the exhaust flow through the harvester 20. The axial position of knob 53 relative to cap 50 provides a means of externally adjusting the axial position of needle 47 relative to nozzle 64 by restricting the axial movement of pin 48 as fluid pressure acting on the underside of check seal 46 exerts a force to push needle 47 away from nozzle 64. In this manner, needle 47, pin 48, cap 50, knob 53, and check seal 46 with body 30 form a throttling device and check valve which perform the function of the conventional speed controlling throttling device 8A and check valve 8B respectively, as shown schematically in FIGS. 1 and 2.

FIG. 11 shows the operation of harvester 20 when supply fluid is flowing from line 9B to actuator port 6B (see also FIG. 3A). Pressurized fluid flowing from the supply 12 enters port 66 in housing 30 and flows through passage 65 into cavity 63. The pressure of the fluid, acting on the topside of check seal 46, causes the skirt of the check seal 46 to collapse, allowing the fluid to flow around the annular area formed between the periphery of the skirt and the walls of cavity 63. Fluid pressure acting on the topside of check seal 46 and the top surface of needle 47 exerts a force to push needle 47 downwards until O-ring seal 45 seats against the bottom of cavity 63, which prevents the flow of fluid through nozzle 64 (see also FIG. 9). The flow exits cavity 63 through passage 62 and passes out of port 61 in housing 30 to supply port 6B of actuator 1 with pressurized fluid.

Figure 12:
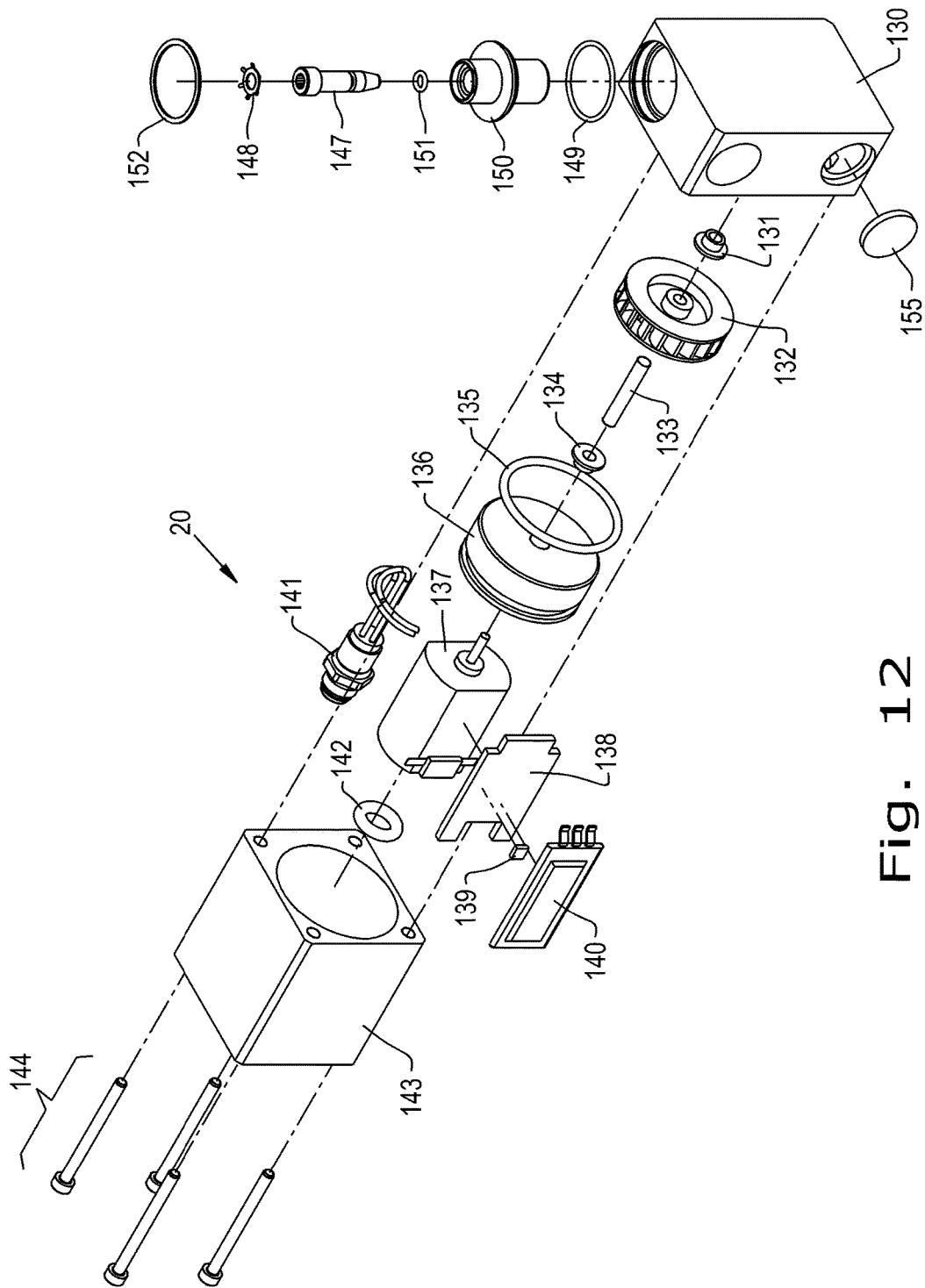
FIG. 12 is an exploded view of another embodiment of an energy harvester according to the present invention.
Figure 13:
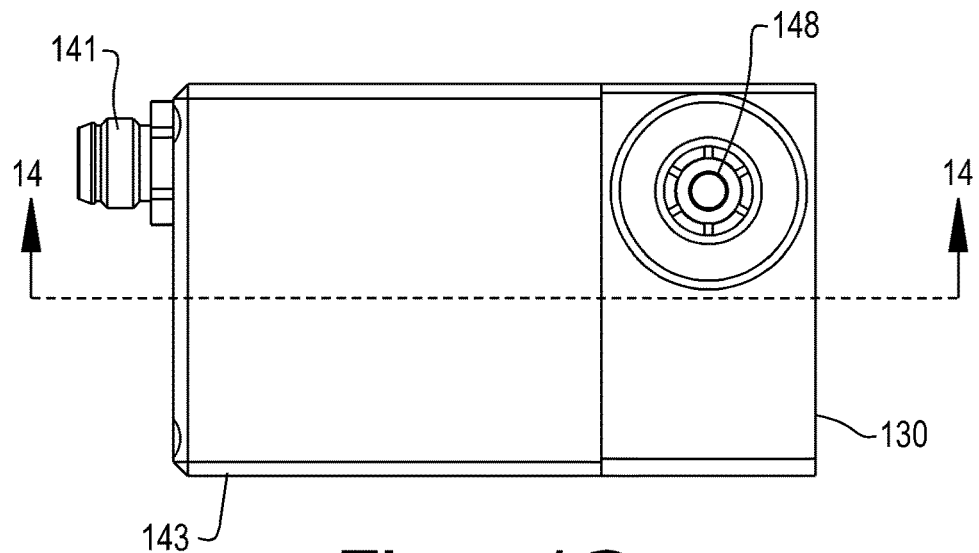
FIG. 13 is a top view of the energy harvester as shown in FIG. 12.
Figure 14:
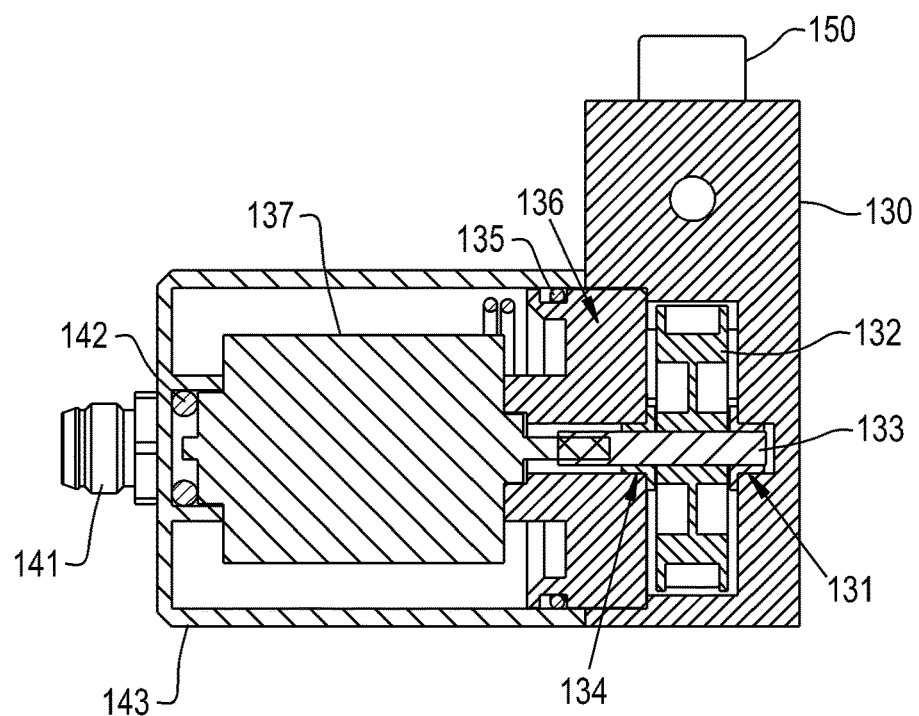
FIG. 14 is a cross sectional view of the energy harvester as shown in FIG. 13 taken across line 14-14.

FIG. 12 shows an exploded isometric view, and FIGS. 14 and 16 show section views, of a second embodiment of the energy harvester 20, suitable for attachment to exhaust port 11 of valve 10 as shown in FIG. 3B. Bearing bushing 131 is disposed into a mating bore in housing 130. Shaft 133 is bonded to turbine 132 so that rotation of turbine 132 causes a like rotation of shaft 133, with one end of shaft 133 supported by bearing bushing 131. The opposing end of shaft 133 is supported by bearing bushing 134. Bushing 134 is disposed into a mating bore in plug 136. The actions of bearing bushings 131 and 134 allow shaft 133 and turbine 132 to rotate freely, while preventing axial translation of the shaft 133 and turbine 132 between plug 136 and housing 130. O-ring seal 135 seals the periphery of plug 136 to prevent the ingress of moisture past the plug 136. The input shaft of electrical generator 137 is bonded to one end of shaft 133 so that rotation of the shaft 133 by turbine 132 causes a like rotation of the generator input shaft. The electrical output terminals of generator 137 are electrically connected to printed circuit board (PCB) 138. Also, electrically connected to PCB 138 are charging controller IC 139 and storage super-capacitor 140. Turbine 132, generator 137, charging controller IC 139, and storage super-capacitor 140 perform the actions respectively of converter 20A, generator 20B, charging controller 20C, and storage medium 20D, as shown schematically in FIG. 4. Electrical connector 141 connects electrically to PCB 138 and provides a way of connecting harvester 20 to an external load, represented schematically as load 25 in FIG. 4. Elastomeric O-ring 142 is disposed within a bore in cover 143 so as to remove any physical space that might occur between generator 137 and cover 143 resulting from the dimensional variation of the components that comprise the harvester 20. Threaded fasteners 144 physically attach cover 143 to housing 130. Needle 147 is disposed within a complimentary bore in cap 150 with a treaded portion of needle 147 engaging mating threads in cap 150. In this manner, rotation of needle 147 relative to cap 150 causes needle 147 to move along the longitudinal axis of cap 150. Retaining ring 148 prevents needle 147 from subsequently being able to be completely unthreaded from cap 150. O-ring seal 151 is disposed within a complimentary gland in needle 147 and prevents the egress of fluid between the bore in cap 151 and the body of needle 147. The flange portion of cap 150 is disposed into a complimentary bore in housing 130. Retaining ring 152 retains cap 150 within a mating bore in housing 130.

Arrows 160 in FIG. 16 show the direction of flow of pressurized exhaust fluid through harvester 20. The housing 130 has at least one fluid passageway, for example, it may include three fluid passageways in the form of a passage 165, a cavity 163, and a nozzle 164. Passage 165 fluidly connects port 166 with the cavity 163. The moveable needle 147 is associated with at least one fluid passageway of the housing 130. In the present embodiment, the needle 147 is partially disposed within the cavity 163 and can be selectively moved with respect to and engaged with the nozzle 164 to adjust and/or close off fluid flow therethrough. In this manner, the needle 147 is configured to adjust a flow of the fluid as it can adjust fluid flow within cavity 163 and through nozzle 164.

In operation, pressurized fluid enters port 166 in housing 130 and flows through passage 165 into cavity 163 and through the annular orifice formed between needle 147 and conical nozzle 164 in body 130. Nozzle 164 directs the fluid flow to impinge upon the vanes of turbine 132 causing the turbine 132 to spin along with shaft 133. The exhaust flow, depleted of kinetic energy by the action of impingement against the vanes of turbine 132, subsequently exits housing 130 through outlet 167 and porous plug 155, which is retained in a complimentary bore in housing 130.

The axial position of needle 147 relative to nozzle 164 determines the area of the annulus through which the fluid flows prior to exiting through the nozzle 164. During operation of the harvester 20, needle 147 is first rotated relative to cap 150, which remains stationary relative to body 130, to adjust the axial position of needle 147 so that needle 147 is fully retracted from nozzle 164. Throttling devices 7A and 8A may be included and subsequently adjusted to obtain the desired extend and retract speeds of rod 2 of the actuator 1 (see also FIGS. 1 and 2). Needle 147 is finally rotated relative to cap 150, to reduce the annular area formed between needle 147 and nozzle 164, until the reduction in area begins to reduce the extend and/or retract speed of actuator 1. In this manner, exhaust fluid is caused to exit nozzle 164 at the highest flow speed practical without adversely altering the desired actuation speed of actuator 1. Such high flow speed provides for an exhaust flow with a kinetic energy content as great as is possible, to provide for optimal energy transfer from the fluid to turbine rotor 132.

Figure 17:
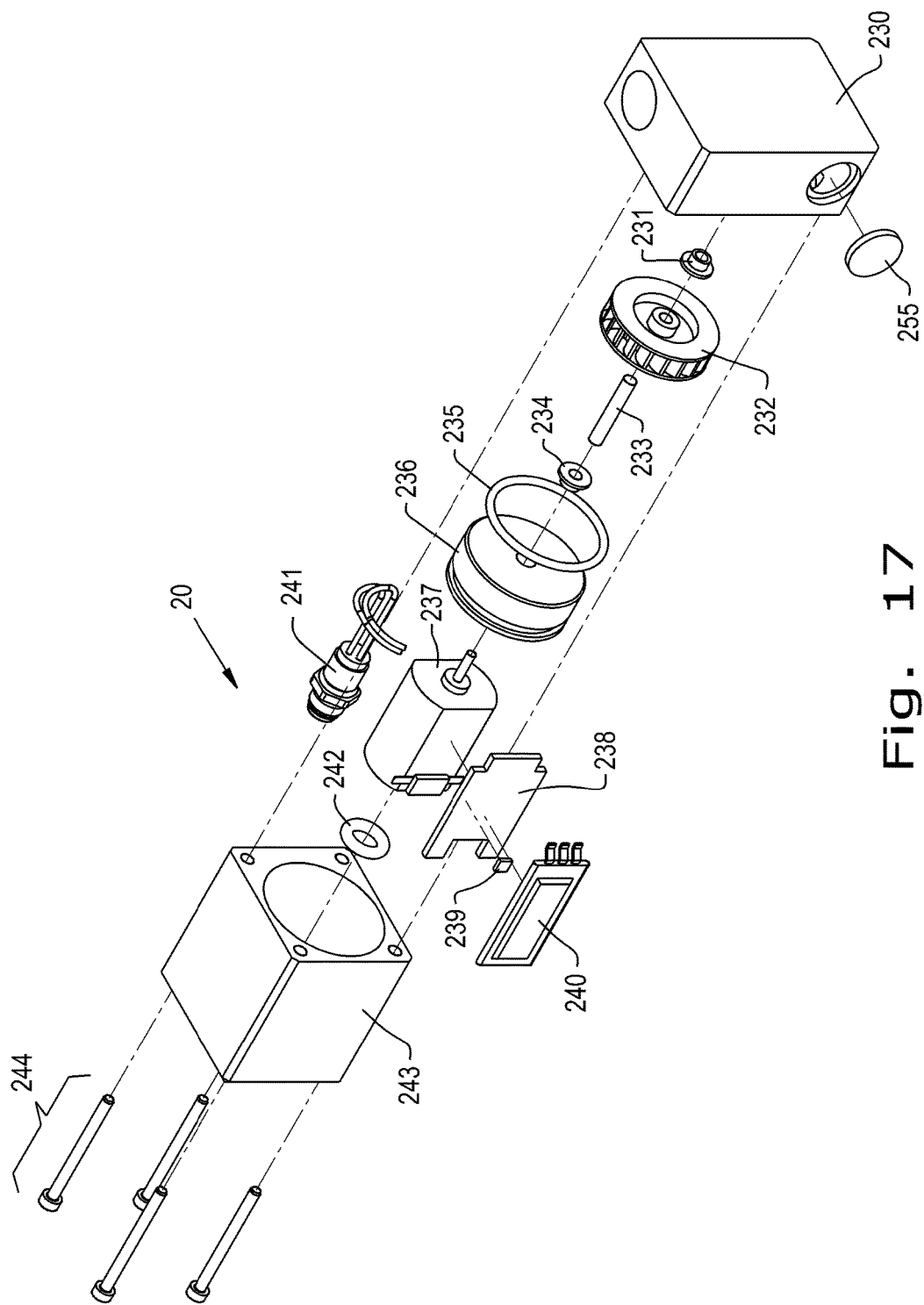
FIG. 17 is an exploded view of another embodiment of an energy harvester according to the present invention.
Figure 18:
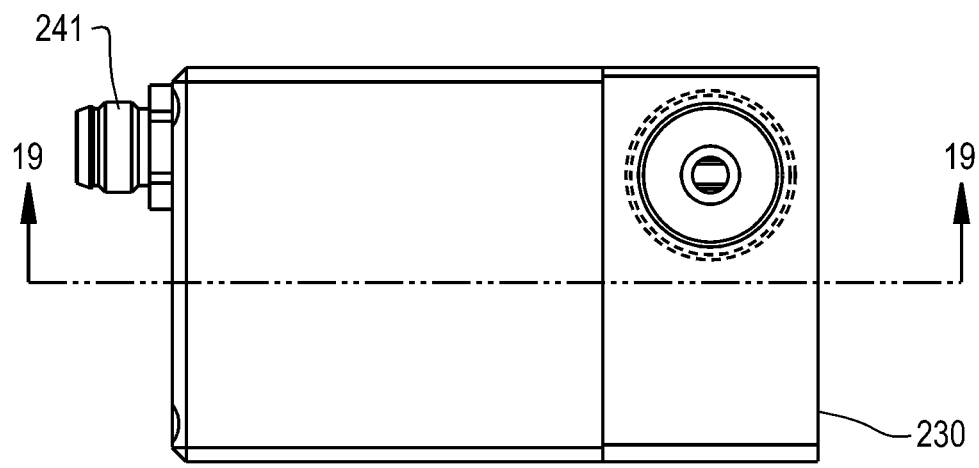
FIG. 18 is a top view of the energy harvester as shown in FIG. 17.
Figure 19:
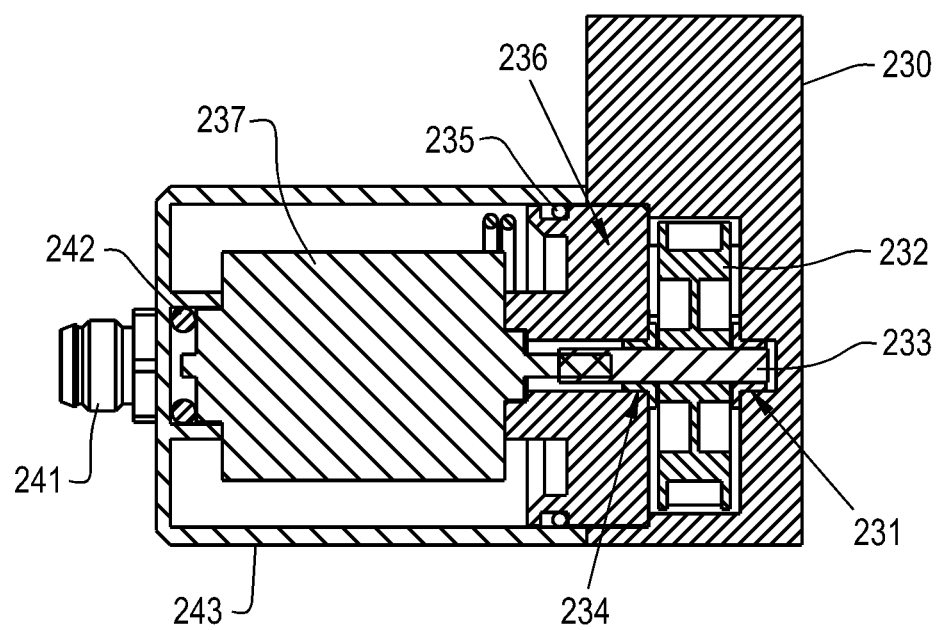
FIG. 19 is a cross sectional view of the energy harvester as shown in FIG. 18 taken across line 19-19.

FIG. 17 shows an exploded isometric view, and FIGS. 18 and 19 show section views, of a third embodiment of the energy harvester 20, suitable for attachment to exhaust port 11 of valve 10 as shown in FIG. 3B. Such an embodiment may be desirable as a lower cost alternative for those applications wherein optimization of the harvested energy is not required. Bearing bushing 231 is disposed into a mating bore in housing 230. Shaft 233 is bonded to turbine 232 so that rotation of turbine 232 causes a like rotation of shaft 233, with one end of shaft 233 supported by bearing bushing 231. The opposing end of shaft 233 is supported by bearing bushing 234. Bushing 234 is disposed into a mating bore in plug 236. The actions of bearing bushings 231 and 234 allow shaft 233 and turbine 232 to rotate freely, while preventing axial translation of the shaft 233 and turbine 232 between plug 236 and housing 230. O-ring seal 235 seals the periphery of plug 236 to prevent the ingress of moisture past the plug 236. The input shaft of electrical generator 237 is bonded to one end of shaft 233 so that rotation of the shaft 233 by turbine 232 causes a like rotation of the generator input shaft. The electrical output terminals of generator 237 are electrically connected to printed circuit board (PCB) 238. Also, electrically connected to PCB 238 are charging controller IC 239 and storage super-capacitor 240. Turbine 232, generator 237, charging controller IC 239, and storage super-capacitor 240 perform the actions respectively of converter 20A, generator 20B, charging controller 20C, and storage medium 20D, as shown schematically in FIG. 4. Electrical connector 241 connects electrically to PCB 238 and provides a way of connecting harvester 20 to an external load, represented schematically as load 25 in FIG. 4. Elastomeric O-ring 242 is disposed within a bore in cover 243 so as to remove any physical space that might occur between generator 237 and cover 243 resulting from the dimensional variation of the components that comprise the harvester 20. Threaded fasteners 244 physically attach cover 243 to housing 230.

Figure 21:
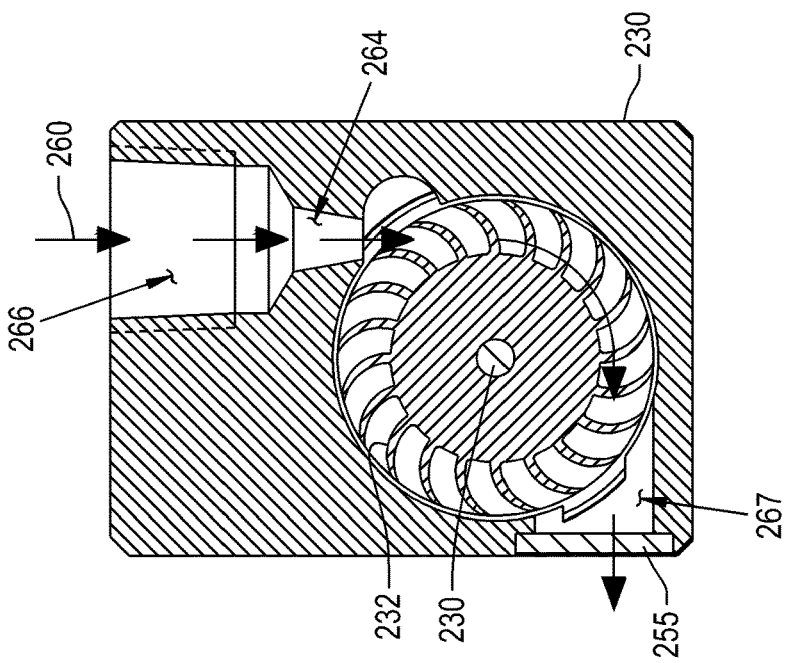
FIG. 21 is a cross sectional view of the energy harvester as shown in FIG. 20 taken across line 21-21.
Figure 20:
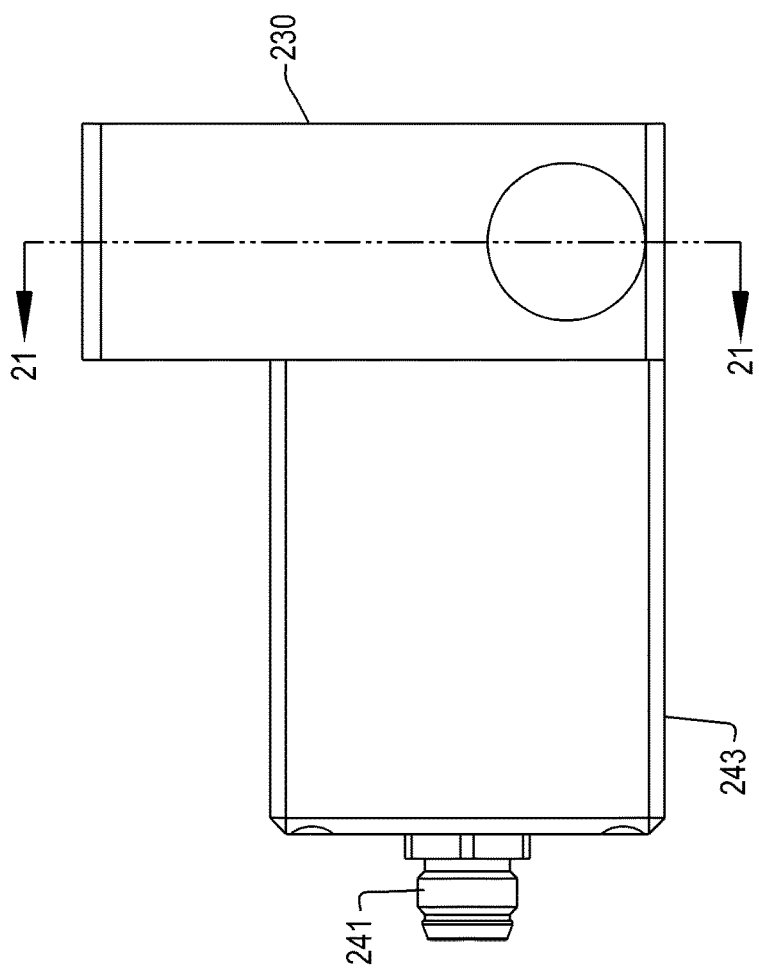
FIG. 20 is a side view of the energy harvester as shown in FIG. 17.

Arrows 260 in FIG. 21 show the direction of flow of pressurized exhaust fluid through harvester 20. The housing 230 has at least one fluid passageway, for example, it may include a fluid passageway in the form of a nozzle 264, e.g., a fixed orifice nozzle. The dimensions of nozzle 264 are selectively chosen to control the velocity of fluid passing through the orifice so formed, creating the ability to meter the flow rate of the exhaust flow through the harvester 20.

In operation, pressurized fluid enters port 266 in housing 230 and flows through the orifice formed by conical nozzle 264 in body 230. Nozzle 264 directs the fluid flow to impinge upon the vanes of turbine 232 causing the turbine 232 to spin along with shaft 233. The exhaust flow, depleted of kinetic energy by the action of impingement against the vanes of turbine 232, subsequently exits housing 230 through outlet 267 and porous plug 255, which is retained in a complimentary bore in housing 230.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A fluid energy harvester, comprising:
   a housing having a first port, a second port and an outlet, and said housing defining at least one fluid passageway therein;
   a converter disposed within the housing and configured to convert at least a portion of potential energy in an exhaust fluid;
   a generator operably coupled to the converter and configured to generate an electrical current from the converter;
   a charging controller electrically coupled to the generator;
   a storage medium electrically coupled to the generator and configured to store the electrical current generated by the generator;
   a nozzle configured to control a flow of the exhaust fluid; and
   a moveable needle disposed within the at least one passageway of the housing and configured to control a flow of the exhaust fluid, the moveable needle can move relative to the nozzle and can engage with the nozzle to block the flow of the exhaust fluid from passing through the nozzle, and the moveable needle can disengage from the nozzle to allow the flow of the exhaust fluid to pass through the nozzle and thereby to the converter, and wherein exhaust fluid flowing into said first port of the housing causes the moveable needle to engage with the nozzle, thereby allowing the exhaust fluid to freely pass through the second port of the housing, and wherein exhaust fluid flowing into the second port of the housing causes the moveable needle to disengage from the nozzle, thereby allowing the exhaust fluid to flow to the converter and exit through the outlet of the housing.

2. The fluid energy harvester of claim 1, wherein said nozzle directs the flow of the exhaust fluid to impinge upon the converter such that the exhaust fluid is depleted of potential energy.

3. The fluid energy harvester of claim 2, wherein said fluid energy harvester provides at least a portion of the electrical current in the form of a power supply to an external load that is electrically coupled to the fluid energy harvester.

4. The fluid energy harvester of claim 3, wherein said charging controller directs the electrical current generated by the generator into the storage medium during a period when the electrical current produced by the generator exceeds a demand by said external load, and said charging controller provides the electrical current stored in the storage medium to said external load during a period when the demand by the external load exceeds the electrical current produced by generator.

5. The fluid energy harvester of claim 1, wherein said fluid energy harvester further includes a circuit board that is electrically coupled to the generator and the charging controller.

6. An actuating system, comprising:
a fluid supply for supplying a fluid;
an actuator, including:
   a piston having a piston rod, a first piston face, and a second piston face;
   a piston housing substantially encasing the piston and defining a first volume and a second volume respectively adjacent to the first piston face and the second piston face; and
   a first port and a second port fluidly connected respectively with the first volume and the second volume of the piston housing;
a valve fluidly connected to the fluid supply and the actuator, and having an exhaust port; and
a fluid energy harvester fluidly connected to the actuator, including:
   a housing having a first port, a second port, and an outlet, and said housing defining at least one fluid passageway therein and including a nozzle;
   a converter disposed within the housing and configured to convert at least a portion of potential energy in the fluid exhausting from the actuator;
   a generator operably coupled to the converter and configured to generate an electrical current from the converter;
   a charging controller electrically coupled to the generator;
   a storage medium electrically coupled to the generator and configured to store the electrical current generated by the generator; and
   a moveable needle disposed within the at least one passageway of the housing and configured to control a flow of the fluid, said moveable needle can move relative to the nozzle and can engage with said nozzle to block the flow of the fluid from passing through the nozzle, and the moveable needle can disengage from said nozzle to allow the flow of the fluid to pass through the nozzle and thereby to the converter, and wherein fluid flowing to said actuator passes through said first port of the housing of the fluid energy harvester, causing the moveable needle to engage with the nozzle, and thereby allowing the fluid to freely pass through said second port of the housing of the fluid energy harvester to said actuator, and said fluid exhausting from said actuator passes through said second port of the housing of the fluid energy harvester, causing the moveable needle to disengage from the nozzle, and thereby allowing the fluid to flow to the converter and exit through said outlet of the housing of the fluid energy harvester.

7. The actuating system of claim 6, wherein said moveable needle controls at least one of the fluid entering and exiting said actuator such that a speed of the piston is regulated.

8. The actuating system of claim 6, wherein said charging controller directs the electrical current generated by the generator into the storage medium during a period when the electrical current produced by the generator exceeds a demand by an external load coupled to the fluid energy harvester, and said charging controller provides the electrical current stored in the storage medium to the external load during a period when the demand by the external load exceeds the electrical current produced by generator.

9. The actuating system of claim 6, wherein the fluid energy harvester further includes a pin, a cap, a knob, and a check seal associated with said housing of the fluid energy harvester whereby the cap partially houses the pin, the knob threads onto the cap, the pin is coupled to the needle and is free to translate longitudinally within the cap, and the check seal is affixed to the needle such that the needle, pin, cap, knob, and check seal together perform a respective function of at least one of a throttling device and a check valve.

10. The actuating system of claim 9, wherein said knob can be adjusted by a user to adjust a position of said needle within said at least one passageway of said housing of the fluid energy harvester in order to adjust a speed of said piston.

11. The actuating system of claim 6, wherein the fluid energy harvester is located adjacent to at least one of the first and second port.

12. An actuating system, comprising:
a fluid supply for supplying a fluid;
an actuator, including:
   a piston having a piston rod, a first piston face, and a second piston face;
   a piston housing substantially encasing the piston and defining a first volume and a second volume respectively adjacent to the first piston face and the second piston face; and
   a first port and a second port fluidly connected respectively with the first volume and the second volume of the piston housing;
a valve fluidly connected to the fluid supply and the actuator, and having an exhaust port; and
a fluid energy harvester fluidly connected to the actuator, including:
   a housing having a port and an outlet, and said housing defining at least one fluid passageway therein;
   a converter disposed within the housing and configured to convert at least a portion of potential energy in the fluid exhausting from the actuator;
   a generator operably coupled to the converter and configured to generate an electrical current from the converter;
   a charging controller electrically coupled to the generator;
   a storage medium electrically coupled to the generator and configured to store the electrical current generated by the generator;
   a moveable needle associated with the at least one passageway of the housing and configured to control a flow of the fluid;
   a pin coupled to the moveable needle;
   a cap partially housing the pin;
   a knob threaded onto the cap; and
   a check seal associated with said housing, wherein the pin is free to translate longitudinally within the cap, and the check seal is affixed to the moveable needle such that the moveable needle, pin, cap, knob, and check seal together perform a respective function of at least one of a throttling device and a check valve, and the knob is configured to be adjusted by a user to adjust a position of the moveable needle within said at least one fluid passageway of the housing of the fluid energy harvester in order to adjust a speed of said piston.

13. The actuating system of claim 12, wherein said at least one fluid passageway of the housing includes a nozzle.

14. The actuating system of claim 12, wherein said charging controller directs the electrical current generated by the generator into the storage medium during a period when the electrical current produced by the generator exceeds a demand by an external load coupled to the fluid energy harvester, and said charging controller provides the electrical current stored in the storage medium to the external load during a period when the demand by the external load exceeds the electrical current produced by generator.

15. The actuating system of claim 12, wherein the fluid energy harvester is located downstream and adjacent to said exhaust port of said valve.

16. The actuating system of claim 12, wherein the fluid energy harvester is located downstream and adjacent to a discrete flow control.

\* \* \* \* \*